United States Patent Office 3,536,866
Patented Oct. 27, 1970

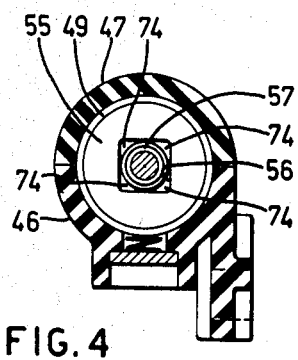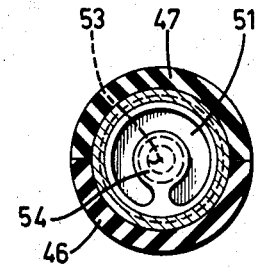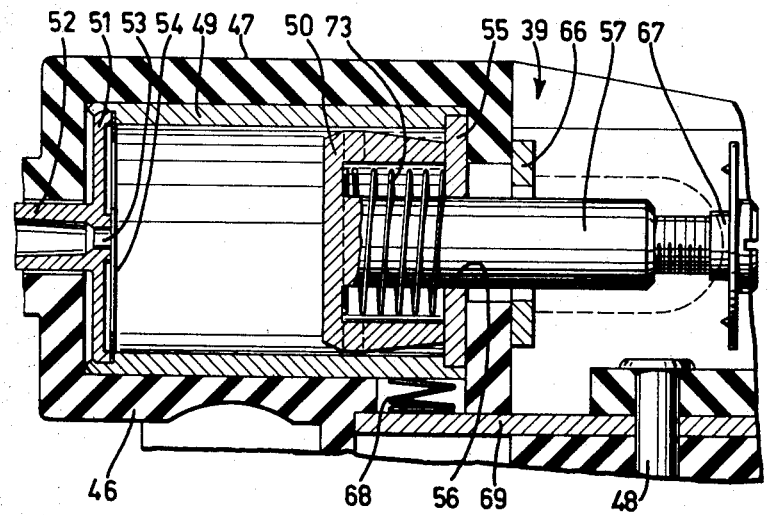

3,536,866
LUBRICATION WARNING DEVICE FOR SEWING MACHINES
Nerino Marforio, Milan, Italy, assignor to S.p.A. Virginio Rimoldi & C., Milan, Italy
Filed Aug. 29, 1968, Ser. No. 756,276
Claims priority, application Italy, Sept. 13, 1967, 20,413/67
Int. Cl. H01h 43/28
U.S. Cl. 200—33      5 Claims

ABSTRACT OF THE DISCLOSURE

A device applicable to sewing machines for giving a warning as to the existence of defective lubrication pressure conditions.

---

The invention refers to a device for giving a warning as to loss of the lubrication pressure in a sewing machine having a pressure lubrication system, comprising a pump unit and delivery pipe.

Generally, in sewing machines which run at high velocities, 7,000 r.p.m. and more, there is a highly efficient pressure lubrication system which assures high efficiency and a good cooling of the mechanical parts of the machine. In known machines, however, seizing of the moving parts often occurs because of a reduction or total interruption of the flow of lubricant in the circuit. The causes which can bring about such loss of oil flow are many and among these are imperfect functioning of the pump unit, breakages, slipping of the drive belt, plugging of the filter cleaning the lubricant, or breaking of the lubricant delivery pipe, etc.

Up until now determination of lubrication conditions in sewing machines was possible through observation of the spyglass showing the lubricant level and through observation of the transparent domes into which the lubricant is sprayed to be atomized and then distributed, in the form of minute particles in suspension in the air, onto the parts to be lubricated. Heretofore, the known systems provided no external indication or warning of lubrication deficiencies but indicated only whether or not the lubricant was in circulation, so that, in the case of scarce or insufficient lubrication, it was not possible to intervene in time to avoid inevitable damage to the machine.

An object of the present invention is to provide a device for controlling lubrication in sewing machines whereby the operator may intervene and stop the machine immediately upon the occurrence of lubrication deficiencies.

Other objects are those which are inherent in the present disclosure.

The foregoing objects are realized through a device for controlling lubrication made so as to be directly influenced by the lubricant in circulation in the circuit in order to reveal, signal and eventually interrupt the action of the machine every time the pressure of the lubricant, which is proportioned to the speed of the machine, descends below a pre-set minimum value and, on the other hand, so made as not to make any signal in response to the short stops of the machine which are necessary for the changing of the work during normal operating conditions.

More specifically, the device includes a pressure switch, connected to the delivery pipe of the lubrication circuit, this switch being associated with a timed switch connected by means of an electric circuit to signalling means capable of interrupting the machine running; said pressure switch being opened by the pressure of the lubricant circulating through said pipe and, vice versa, being closed with a delay by spring means at the cessation of pressure.

An obvious advantage offered by the device of this invention is that embodied in the fact that the machine operator is no longer bothered with having to observe the lubrication spyglass and so her attention can be entirely concentrated on the work.

Another advantage offered by said device is that embodied in the fact that the signalling means are not activated immediately every time the machine stops, so that the operator can carry out all normal operations including replacement of the workpiece without being disturbed by the actuation of signalling means.

Other characteristics and advantages of the device will be apparent from the detailed description which follows of a preferred embodiment which description is referred to the accompanying drawings wherein:

FIGS. 4 and 5 are two section views through the pressure switch taken along lines IV—IV and V—V respectively, in FIG. 3; and, FIG. 6 is an enlargement of a portion of FIG. 3.

Figure 1:
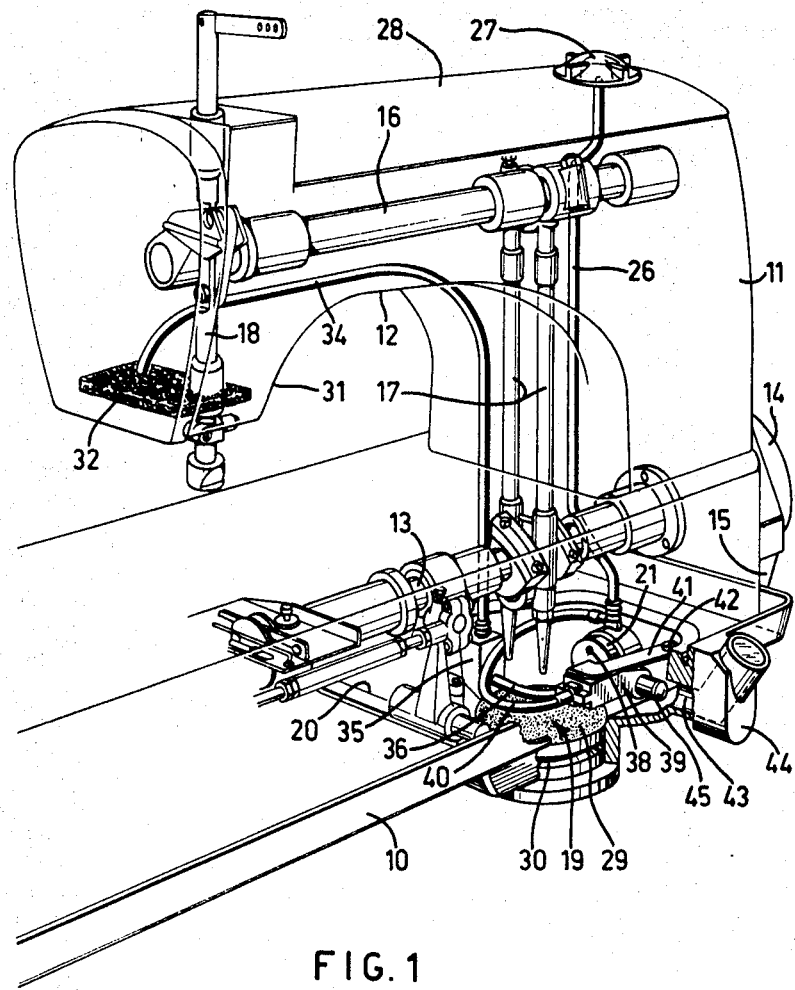
FIG. 1 shows, in perspective, a sewing machine fitted with a pressure switch and lubrication circuit according to this invention.
Figure 2:
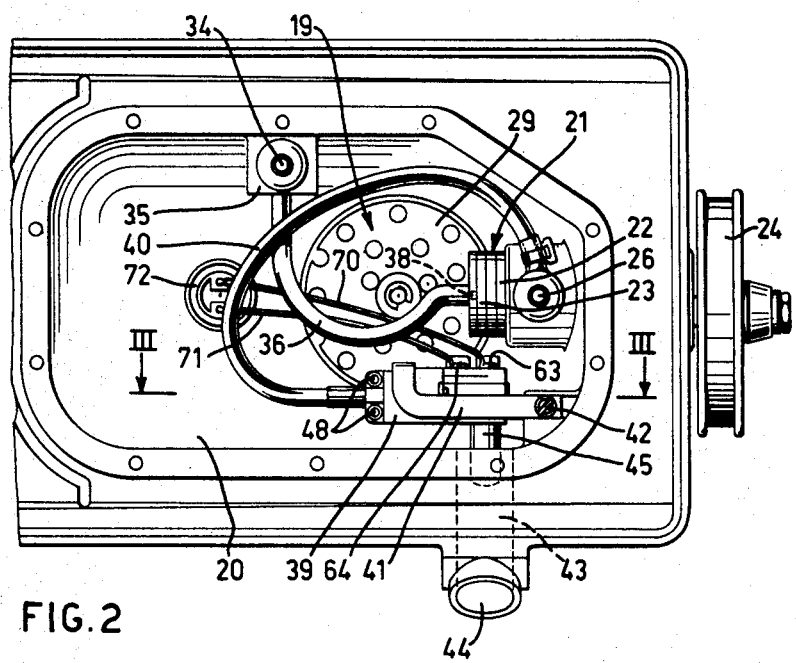
FIG. 2 is a plan view of a reservoir according to the invention for collecting the lubricant.

With particular reference to FIGS. 1 and 2, a sewing machine is generally formed by a bed plate 10, a standard 11 fixed vertically above said bed plate and by an overhanging arm 12 mounted above said standard. For convenience of representation the sewing machine has been imagined as being transparent. Within the bed plate 10 is mounted the rotatable mainshaft 13 as also are mounted those conventional parts, not visible in the figure, which are driven by said shaft and which usually serve to feed the work and, in cooperation with the needle, serve to form the sewing stitches.

Shaft 13 carries, outwardly of bed plate 10, a pulley 14 connected in known manner through a drive belt 15 to known drive means (not shown) for driving the machine. Within arm 12 is mounted an oscillating shaft 16 which receives movement from shaft 13 through a conrod 17 vertically mounted within standard 11. Shaft 16 transmits reciprocating movements to a vertical needle bar 18, as is well known.

The sewing machine is provided with a pressure lubrication circuit 19 comprising a basin-like reservoir 20, which is fixed under the bed plate 10, and also comprising a pump unit 21 mounted within said reservoir 20. The pump unit 21 is constituted by two gear pumps 22 and 23 of known shape and construction and so not shown in detail in the drawings, which are made to turn by a single pulley 24 connected in known manner to said drive belt 15.

Pump 22 discharges into a substantially vertical pipe 26 which is provided to conduct the lubricant under pressure into a dome of transparent material 27 mounted on the cover 28 which closes the top of arm 12. Dome 27 is traditional and serves to atomize the lubricant which is sprayed from pipe 26 and which in this way is distributed, in the form of minute drops in suspension in the air, onto the parts to be lubricated.

The lubricant distributed in the method above described drops towards the bed plate and from there drains into the reservoir 20 after having lubricated the mechanical parts of the machine.

During its return flow towards said reservoir, however, the lubricant gathers and carries with it all the impurities it encounters, such as the down produced by the rubbing of the sewing threads against the metal parts. For this reason there is, in reservoir 20, a filter 29 through which the lubricant is filtered to be purified before being put back in circulation. A circular channel 30, below said filter 29, collects the purified lubricant and conducts it towards the suction inlet to pump 22 with which it is connected.

Not all the lubricant which drops from the lubricated parts flows spontaneously into reservoir 20, but a certain quantity gathers in the lowest area of the head 31 of arm 12. To eliminate this stagnation, there is provided in said area a felt 32 into which leads the open end of a pipe 34 which is connected to pump 23 through a coupling 35 and a pipe 36. In this way the pump 23 sucks up the lubricant which is gathered on the felt 32 and discharges it into reservoir 20 to be purified.

To ensure proper and effective lubrication of the sewing machine parts, it is necessary that the rate of flow of the lubricant increase in accordance with any increase in the speed of the mainshaft in order to carry away the increased heat which developes at higher speeds. If such increased heat is not carried away seizing of the moving parts occurs. Furthermore, some automatic actioning means is needed which is responsive to lubrication deficiencies since the known spyglass expedient does not permit immediate enough response by the operator to prevent damage to the machine parts.

In order to avoid the danger of continuing operation of the machine under conditions of defective lubrication, the pressure lubrication circuit 19 includes an electric switch means 39 for lighting up a red warning lamp, which switch is actuated by the pressure of the lubricant circulating in the machine. Pressure switch means 39 is connected by a pipe 40 to the delivery pipe 26 of the pump 22, so that it is directly influenced by variations in pressure of the lubricant which flows through said delivery pipe.

When the flow of lubricant is regular and its rate corresponds to that required at the velocity reached by the machine parts, and, correspondingly, the pressure in pipe 26 assumes a predetermined value, the electric switch remains open and the warning lamp remains off. Vice versa, when the flow rate of lubricant diminishes and no longer corresponds to that required for effective lubrication, and therefore the pressure existing in the pipe reaches a predetermined minimum value, the electric switch responds to this drop in pressure and closes and lights said warning lamp which signals the imminent danger of damage to the machine. The pressure switch 39 is fixed to reservoir 20 by means of a plate 41 and a screw 42. Said pressure switch is provided with a colored bulb 45 which is exteriorly accessible and visible through spyglass 44 whose passageway 43 is aligned with the bulb 45.

Figure 3:
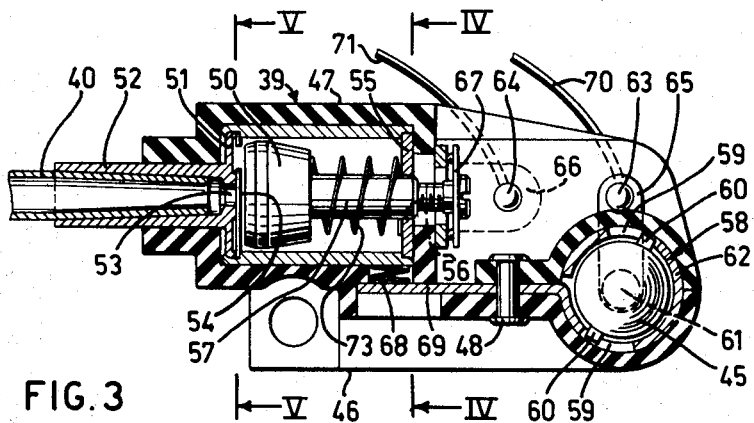
FIG. 3 is an enlarged section view through the pressure switch taken along the line III—III in FIG. 2.

Pressure switch 39 is composed of a body of insulating material formed by a support 46 (FIG. 3) and cover 47 locked together in known manner by several rivets 48. Between the support 46 and the cover 47 is enclosed, in an appropriate way, a hollow cylinder 49 inside which is free to slide a piston 50 having a slightly smaller diameter than the cylinder inner diameter thereby defining therebetween a restricted annular clearance through which the lubricant can axially flow. Cylinder 49 has at one end a sealing diaphragm 51 from which externally extends an attachment pipe 52 which in turn is connected to pipe 40. Diaphragm 51 includes a through hole 53 leading from pipe 52 and internally closed by a lamellar valve 54 (see also FIG. 5). Also enclosed between the support 46 and the cover 47 is a bulb holder 58 provided for the attachment of bulb 45.

Bulb holder 58, which has appropriate shaped slots 59 to be used in conjunction with key-ways 60 for the fixing of bulbs having bayonet fittings, is provided with poles 61 and 62 connected to the two electrical terminals 63 and 64 mounted on the cover 47. Terminal 63 is electrically connected through a plate 65 to the central pole 61 which is sprung and normally pushed towards the interior of the bulb holder 58 to ensure contact with the bulb 45. Terminal 64 is electrically connected to a shaped plate 66 which constitutes the stationary contact of a switch means which also includes a movable contact 67 mounted in an adjustable fashion on the cylindrical rod 57 which, in turn, is in an electrical sense connected through wall 55, cylinder 49 and a contact spring 68 to a tongue 69 of the pole 62. Moreover, the electrical terminals 63 and 64 are connected by electrical cables 70 and 71, respectively, to a current pick-up plug 72 (FIG. 2) screwed into the bottom of reservoir 20 and externally connected to any source of low tension current derived from the usual machine driving means.

Thus, the electric circuit for feeding the bulb 45 comprises the bulb holder 58, the electrical terminals 63 and 64, the cylinder 49 and the piston rod 57 together with the switch contacts 66 and 67 and, lastly, the electrical cables 70 and 71.

Normally piston 50 is kept in its rest position, against the diaphragm 51, by a coil spring 73 mounted around rod 57 between said piston and end wall 55 of the cylinder 49. When the piston is in said rest position the switch is closed by virtue of movable contact 67 being in contact with stationary contact 66 so that if the machine driving means are functioning, the bulb is lit. When the sewing machine is made to function by the above-mentioned means, pump 23 forces lubricant into pipe 26 and into pipe 40 and immediately the pressure, which is proportional to the number of revolutions of the pump and thus to the mainshaft 13, overcomes the resistance of spring 73 and the lubricant flows into cylinder 49 through hole 53 moving the piston 50 back towards the end wall 55 against which it comes to rest plugging the square hole 56 (see also FIG. 6). Also movable contact 67, moving together with said piston, has detached itself from plate 66 thus interrupting the passage of current so that bulb 45 goes out.

As the resistance of spring 73 is of a pre-established value, it is evident that piston 50 moves itself to open the bulb switch when the lubricant pressure has reached a predetermined value which is proportional to a certain number of minimum revolutions of the mainshaft of the machine, below which pump 23 is ineffectual to assure sufficient lubrication. For so long as said pressure is sufficient to overcome the force of spring 73, square hole 56 remains closed by piston 50 which rests against wall 55, so that from cylinder 49 there is no flow of lubricant and, therefore, no pressure loss in the system. Immediately when the machine speed falls below the pre-established minimum value, the force of spring 73 on piston 50 overcomes the residual pressure of the lubricant and pushes piston 50 towards its position of rest against diaphragm 51.

The pushing by said spring blocks the lamellar valve against hole 53, thus impeding the out-flow of lubricant which is, therefore, forced to seep through the small peripheral clearance provided between piston 50 and the cylinder 49. As said clearance is of very small cross-sectional area and, moreover as the piston must traverse a considerable axial distance to reach its rest position, at which point connection is achieved between movable contact 67 and stationary contact 66, it is clear that the closing of the bulb switch will not occur immediately upon the occurrence of a pressure drop, but occurs after a certain time delay. This characteristic of the pressure switch 39 allows the carrying out, with the machine stopped, of the change over from a finished workpiece to one still to be stitched, as it also allows small tracts of stitching to be carried out at low speeds without this causing the bulb to light, because the time needed for such operations is lower than the time that the piston takes to reach its own rest position. In fact, as the time taken by said piston 50 to move from wall 55 to against diaphragm 51 is in the order of 8–15 seconds, when the lubricant has reached working temperature and fluidity, the operator can carry out any operations that require less than that time.

On the other hand a sewing machine that runs at 7,000 revolutions per minute will not suffer damage immediately after the lubrication ceases, but some time must pass before the mechanical parts reach a critical temperature, so that the actual time available for the operator to intervene from the moment at which the bulb lights up is more than is necessary to permit stopping of the machine without damage thereto.

The lubricant that flows around piston 50, between the latter and cylinder 49, is free to flow out through the drain ports 74 which constitute the corner areas of square hole 56 left unplugged by cylindrical rod 57 whose outer diameter is substantially that of a circle which is tangent to the four sides of said hole 56.

According to another embodiment, pressure switch 39 can be provided with an electrical circuit including a timing relay which intervenes, after a pre-established period of time from the lighting of the bulb 45, to interrupt the driving of the machine. Alternatively, pressure switch 39 could actuate a relay, instead of bulb 45, the relay being arranged to cut off the power to the machine drive motor.

The details given herein with reference to preferred modes of realization are illustrative of the scope and applicability of the inventive concept involved, it being understood that said inventive concept is applicable to all modifications, equivalents, or areas of application which are obvious or well within the purview of one skilled in the art.

What is claimed is:

1. A lubrication sensing device for a pressure lubrication system, comprising: a hollow cylinder and a piston slidably mounted within said cylinder, said piston being yieldingly biased to a first position pursuant to the pressure in said system being below a predetermined value and being movable to a second position against the bias thereof pursuant to the pressure in said system being above said value, one end of said cylinder being connected to a pressure point on said system whereby lubricant from the system may flow into the cylinder and act upon one face of the piston to urge it towards said second position, a means yieldingly acting upon the piston to urge it towards said first position, an actuating means driven by said piston for actuating an external device in accordance with the pressure in said system being above or below said value, and including a delaying means which function to delay the activation of said actuating means for a period of time after said piston has initiated its movement towards said first position from said second position, said actuating means comprising an electrical switch means having a pair of contacts openable and closeable pursuant to movement of said piston along the axial extent of said cylinder, an electrical circuit associated with said contacts, a one of said contacts being integrally movable together with said piston and another of said contacts being fixed, said contacts being at a maximum distance away from each other in correspondence to said piston being at said second position and said contacts being closed upon each other in correspondence to said piston being at said first position, said delaying means comprising a damping means associated with said piston whereby upon the lubricant pressure falling below said value said piston moves towards said first position gradually under the action of said damping means and the closing of said contacts occurs only after said piston has completed its travel to said first position, said damping means comprising a small peripheral clearance between the outer wall of the piston and the inner wall of the cylinder, whereby lubricant in the cylinder on one side of the piston may seep along said clearance to the other side of the piston pursuant to said piston being moved to said first position from said second position, said one end of the said cylinder comprising an inlet port for lubricant to flow into the cylinder from a pressure point of the system, a one-way valve arranged to close said port against outflow of lubricant from the cylinder.

2. The sensing device of claim 1, said cylinder including drain means for lubricant in the end thereof opposite to said one end.

3. The sensing device of claim 2, said piston being integral with a cylindrical piston rod, said piston rod extending from the piston to exteriorly of said cylinder through a square opening in an end wall thereof, said drain means comprising the corner areas of said square hole which are unfilled by said piston cylindrical rod.

4. The sensing device of claim 3, said piston comprising an annular edge adapted to sealingly fit against said end wall while surrounding said square hole when said piston is in said second position, whereby lubricant is prevented from flowing outwardly of said cylinder through said square hole when said piston is urged to said second position under action of the lubricant pressure being above said value in said cylinder.

5. The sensing device of claim 4, the piston being biased towards said first position by a coil spring mounted around the piston rod and between the piston and said end wall having the square hole therein.

References Cited

UNITED STATES PATENTS

| | | | |
|---|---|---|---|
| 1,937,173 | 11/1933 | Taylor | 200—34 |
| 2,207,189 | 7/1940 | Austin et al. | 200—34 |
| 2,637,788 | 5/1953 | Bracken | 200—34 |
| 2,712,791 | 7/1955 | Bleakney et al. | 200—34 X |
| 2,794,868 | 6/1957 | McMorran et al. | 200—34 |
| 3,045,076 | 7/1962 | Gaylord | 200—34 |
| 3,179,396 | 4/1965 | Bracken | 200—34 X |

H. O. JONES, Primary Examiner